Feb. 5, 1946.   M. J. BROWN ET AL   2,394,039
CONTROL ARRANGEMENT FOR CIRCUIT BREAKERS
Filed July 11, 1942
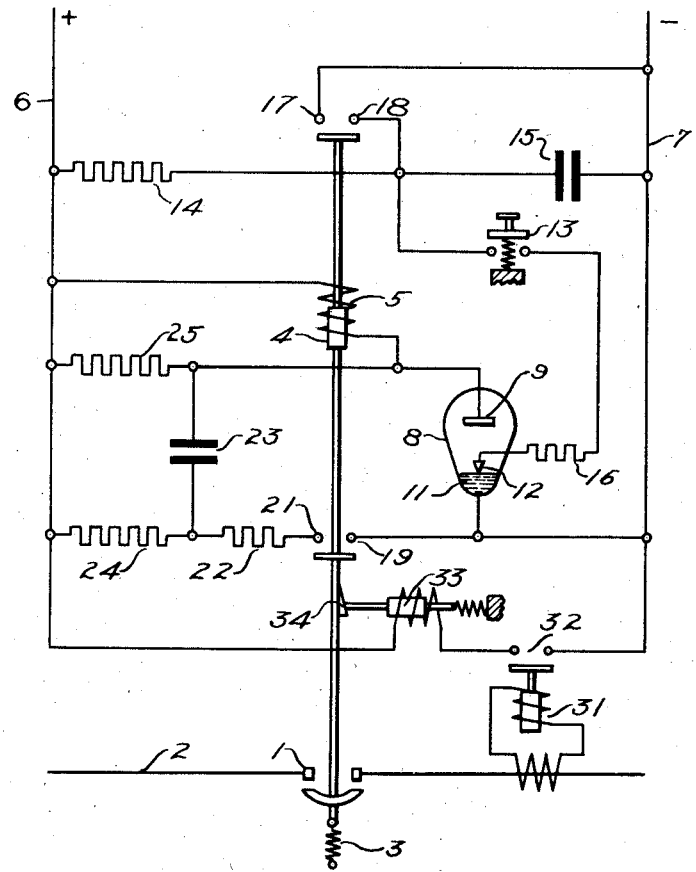
WITNESSES:
INVENTORS
William R. Taliaferro and
Myron J. Brown.
BY
ATTORNEY Patented Feb. 5, 1946

2,394,039

UNITED STATES PATENT OFFICE 2,394,039

CONTROL ARRANGEMENT FOR CIRCUIT BREAKERS

Myron J. Brown, Forest Hills, and William R. Taliaferro, Edgewood, Pa., assignors to Westinghouse Electric Corporation, East Pittsburgh, Pa., a corporation of Pennsylvania Application July 11, 1942, Serial No. 450,512

3 Claims. (Cl. 175—294)

Our invention relates to control arrangements for circuit interrupters and, in particular, relates to arrangements for energizing the closing solenoid of circuit interrupters taking power from direct-current sources, and doing so in such a manner that "pumping," that is to say, repeated successive closures and reopenings of the circuit breaker, is prevented even though there is an overload on the line which the circuit breaker supplies.

It is usual in the electrical art to provide circuit breakers with electrical arrangements operated by a small control switch from some distant point which are capable of moving the circuit breaker to closed-circuit position. In one of the best known arrangements of this type, the movable arm of the circuit breaker is moved to closed-circuit position by the magnetic core of a solenoid, the winding of which is supplied with current from a direct-current source under control of a small manually-operated closing switch. Such circuit breakers are usually also provided with an automatic relay system which trips them to open-circuit position, usually by releasing a latch or by breaking a toggle in a mechanical linkage, when there is an overload on the line which they supply. If, after being tripped open by such an overload, the small control switch is closed, the circuit breaker is moved again to circuit-closing position by the solenoid above mentioned. Now, if the fault which caused the original overload persists on the line, the overload relays will again trip the circuit breaker to open-circuit position.

It frequently happens that the person operating the small control switch will hold it in circuit-closing operation until after the circuit breaker has thus tripped out for the second time; and unless preventive means are provided, the closing solenoid will again reclose the circuit breaker. This cycle of alternate opening and closing of the circuit breaker may continue for a considerable time, and is well known in the art as "pumping." For obvious reasons of wear and tear on the circuit breaker mechanism, it is undesirable that "pumping" should be permitted. Our invention herein disclosed concerns a circuit arrangement employing an electrical discharge tube, for instance one of the type well known in the art under the term "ignitron," for operating the closing solenoid of a circuit breaker and preventing "pumping."

One object of our invention is, accordingly, to provide a circuit for energizing the closing coil of a circuit breaker by means of a small control switch, while at the same time insuring that the maintenance of the control switch in closed position will not result in repeated successive energizations of the closing solenoid.

Another object of our invention is to provide a circuit for energizing the solenoid from a direct-current source through an electrical discharge device having a control electrode energized by a small control switch.

Another object of our invention is to provide a circuit breaker which is controlled by a tripping relay and is moved to closed-circuit position by energization of a closing solenoid with control arrangements which shall insure against "pumping."

Other objects of our invention will become apparent upon reading the following specification, taken in connection with the drawing in which the single figure illustrates schematically a circuit interrupter provided with the control arrangements of our invention.

Referring in detail to the drawing, a circuit interrupter 1, which may be of any conventional type but is here shown as comprising a single pole, is arranged to open and close the circuit of an electric supply line 2. The circuit breaker 1 may be biased to open-circuit position by any suitable means, such as the bias 3, and is arranged to be moved to closed-circuit position by a magnetic core 4 which is attracted by energization of a closing solenoid 5. Such arrangements are well known in the art and require no detailed description here. The solenoid 5 is energized from a direct-current line 6, 7 through an electrical discharge tube 8 of the control-electrode type, here shown for purposes of illustration as an ignitron; that is to say, as a tube having a solid anode 9 connected to the positive line wire 6 and a mercury cathode 11 into which dips an igniter electrode 12. When the anode 9 has a suitable positive voltage impressed upon it relative to the cathode 11, tube 8 will, in general, remain non-conductive until a substantial current flows through the igniter electrode 12. When a pulse of current, preferably of considerable instantaneous magnitude, is caused to flow through the igniter electrode 12, an arc is started between the anode 9 and the cathode 11 and continues to flow until the voltage of the anode 9 relative to the cathode 11 sinks below a relatively small critical value.

Under normal conditions, when the circuit breaker 1 stands either in open-circuit or closed-circuit position, no current flows through either the tube 8 or the solenoid 5 because the igniter electrode 12 is maintained deenergized by a small control switch 13 which is in series with it. If at any time it is desired to energize the solenoid 5 to move the circuit breaker 1 to closed-circuit position, the switch 13 is depressed to bridge its contacts. It will be seen that, when the tube 8 is conductive to current, there is a path for current flow through solenoid 5 from the line wire 6, thence from the anode 9 to the cathode 11 of the tube 8 and back to the line wire 7.

Across the lines 6, 7 are connected in series a resistor 14 and a capacitor 15, and the common junction of these two elements is connected to one terminal of the control switch 13. As long as the switch 13 is in its normal open-circuit position, the capacitor 15 is maintained charged to the potential of lines 6, 7 by charge which has flowed to it through the resistor 14. Under these conditions, closure of the switch 13 will result in discharge of the capacitor 15 through the small resistor 16 and the igniter electrode 12, and this is arranged to suffice to render the tube 8 conductive to current flow from its anode 9 to its cathode 11. The last-mentioned current flow sufficiently energizes the solenoid 5 to move the circuit breaker 1 to its closed-circuit position.

The mechanism of the circuit breaker 1 is provided with a pair of contacts 17, 18 which remain open while the circuit breaker 1 is opened, but are closed by movement of the latter to its closed-circuit position. The respective contacts 17, 18 are connected to bridge the capacitor 15 so that the latter is completely discharged and so maintained as long as the circuit breaker 1 remains closed. The mechanism of circuit breaker 1 is likewise provided with a second pair of auxiliary contacts 19, 21 which are maintained in open-circuit position as long as the circuit breaker 1 is opened, but are closed when the circuit breaker is moved to closed-circuit position. One of the contacts 19 is connected to the negative line wire 7, while the other is connected through a resistor 22 to one terminal of a capacitor 23, the other terminal of the capacitor 23 being connected to the anode 9 of the tube 8. A resistor 24 connects the common junction of the resistor 22 and capacitor 23 with the positive terminal 6 of the supply line. Since the inductance of the solenoid 5 may be relatively high and this might delay current rise through the tube 8 so long after energization of the igniter 12 that the latter would have lost its ionizing power before substantial current flow had time to occur through the tube 8, a resistor 25 is bridged across the terminals of the solenoid 5 to insure that sufficient current can flow between the anode 9 and cathode 11 of the tube 8 to thoroughly ionize the latter just as soon as manual switch 13 is operated. The circuit breaker 1 is arranged to be held in closed-circuit position by a latch 34 which can be released by a solenoid 33 when energized through switch 32 by an overload relay 31 energized by over-current in line 2.

The mode of operation of the above-described arrangement will, it is believed, now be readily apparent. Whenever the circuit breaker 1 is standing open, closure of manual switch 13 will discharge condenser 15 through igniter electrode 12 and render the tube 8 conductive to current flow through the solenoid 5 and its bridging resistor 25 from the positive terminal 6 to the negative terminal 7 of the direct-current circuit. Current flow through the solenoid 5 will move the circuit breaker 1 to its closed-circuit position, at the same time bridging the contacts 17, 18 and 19, 21. The bridging of the contacts 17, 18 discharges the condenser 15, thereby preventing reenergization of the igniter electrode 12, even though the manual switch be closed, at any time while the circuit breaker 1 remains in its closed-circuit position.

While the contacts 19, 21 stand in their normal open position before closure of the circuit breaker 1, the capacitor 23 is charged up with its lower terminal positive and its upper terminal negative by current flow through the resistor 24, capacitor 23, and the arc discharge through the tube 8. The resistor 24 is made small enough so that capacitor 23 charges nearly to voltage of lines 6, 7 while the circuit breaker is moving to closed position. However, as soon as the closure of circuit breaker 1 bridges the contacts 19, 21, the capacitor 23 is suddenly bridged directly between the anode 9 and cathode 11 of the tube 8, and it will be noted that the charge on the capacitor 23 is such as to render the cathode 11 of tube 8 positive relative to the anode 9 thereof. The resistor 22 is made small enough so that this immediately reduces the potential of the anode 9 relative to the cathode 11 far below the small positive value necessary to maintain current flow through the tube 8 and extinguishes the arc in the latter. Except for this action of the capacitor 23, it will be noted that the tendency of mercury arcs, such as that in the tube 8, to continue curernt flow as long as their anodes are slightly positive relative to their cathodes would result in the continual flow of a current from the source 6 through the solenoid 5 and the tube 8, thus wasting energy and overheating the solenoid 5 unnecessarily.

As has previously been pointed out, a circuit breaker like 1 is likely to be tripped out by the occurrence of an over-load on the line 2 which operates through one of the tripping relays well known in the art to move its mechanism to open-circuit position. If now an attendant closes the manual switch 13, the arrangement described in detail above will cause reclosure of the circuit breaker 1. However, if the overload condition still persists on the line 2, the overload relay will again trip out the circuit breaker and move it to open-circuit position. If the attendant still maintains the manual switch closed, however, it will be impossible for the capacitor 15 to recharge substantially because the switch 13, the resistor 16 and the igniter 12 of the tube 8 virtually short-circuit the capacitor 15. The value of the resistors 14 and 16 is made such that the current which will flow through resistor 14, manual switch 13, resistor 16 and igniter 12 is insufficient to ionize the space between the anode 9 and the cathode 11 of the tube 8. Hence current flow through the solenoid 5 will not be resumed and the circuit breaker will remain in its tripped position until such time as the manual switch 13 has been released and reclosed. Thus the arrangement above described prevents "pumping" of the circuit breaker 1.

We claim as our invention:

1. In combination with a circuit interrupter, a source of direct-current energy, an ignitron having principal electrodes and an igniter electrode, a closing solenoid connected in series with said principal electrodes across said source, a resistor and a capacitor connected in series across said source, a connection through an auxiliary switch from the common terminal of said resistor and said capacitor through the igniter electrode of said ignitron, a second capacitor and a resistor serially connected across said solenoid, a pair of contacts closed only when said circuit breaker is closed connected between the common terminal of said second capacitor and said resistor and the cathode of said ignitron, and a second pair of contacts which are closed only when said circuit breaker is closed connected in shunt with the first-mentioned capacitor.

2. In combination with a direct-current source, a solenoid winding connected in series with an electrical discharge tube having an anode, a cathode and a control electrode, the space between said anode and said cathode being rendered conductive only by current flow above a critical value to said control electrode, a first resistor and a capacitor connected in series across said source, an auxiliary switch and a second resistor connecting the common terminal of said first resistor and said capacitor with said control electrode, the value of said first resistor being so great as to prevent current from said source flowing through it serially to said control electrode rising to said critical value.

3. In combination with a direct-current source, a solenoid winding connected in series with an electrical discharge tube having an anode, a cathode and a control electrode, the space between said anode and said cathode being rendered conductive only by current flow above a critical value to said control electrode, a first resistor and a capacitor connected in series across said source, an auxiliary switch and a second resistor connecting the common terminal of said first resistor and said capacitor with said control electrode, the value of said first resistor being so great as to prevent current from said source flowing through it serially to said control electrode rising to said critical value, and the value of said second resistor and said capacitor being such that the discharge current passing through said second resistor in series with said control electrode is greater than said critical value when said capacitor is charged to the voltage of said source.

MYRON J. BROWN.
WILLIAM R. TALIAFERRO.